United States Patent

[11] 3,581,278

[72] Inventor Bobbie Dale Huffman
R.R.24, Box 163, Terre Haute, Ind. 47802
[21] Appl. No. 761,536
[22] Filed Sept. 23, 1968
[45] Patented May 25, 1971

[54] WARNING DEVICE FOR MOVING VEHICLE
7 Claims, 3 Drawing Figs.
[52] U.S. Cl. .................................................. 340/62,
340/54, 340/71, 340/241, 340/262
[51] Int. Cl. .................................................. B60q 1/50
[50] Field of Search .................................................. 340/62,
262, 241, 71, 54

[56] References Cited
UNITED STATES PATENTS
2,681,957 6/1954 Schneider .................... 340/62X
2,832,864 4/1958 Rapp ............................ 340/62UX Primary Examiner—Donald J. Yusko
Assistant Examiner—Michael Slobasky
Attorney—Robert H. Dewey ABSTRACT: A warning device for a self-propelled vehicle comprising an air-pressure sensitive device normally inactivated by motion of the vehicle against air but becoming activated during deceleration at a speed below a predetermined speed thereby signaling others of the deceleration. The device comprises an air pressure responsive means, a microswitch, and one or a multiple of warning lamps. In a preferred embodiment a manually controlled masking means is provided whereby said air-pressure responsive means can be shielded from air pressure by operator of said vehicle. In another embodiment the warning lamps are the turn signals normally present on a vehicle and a means is provided whereby activation of the turn signals by the turn-signal lever automatically inactivates the warning device.

PATENTED MAY 25 1971  3,581,278
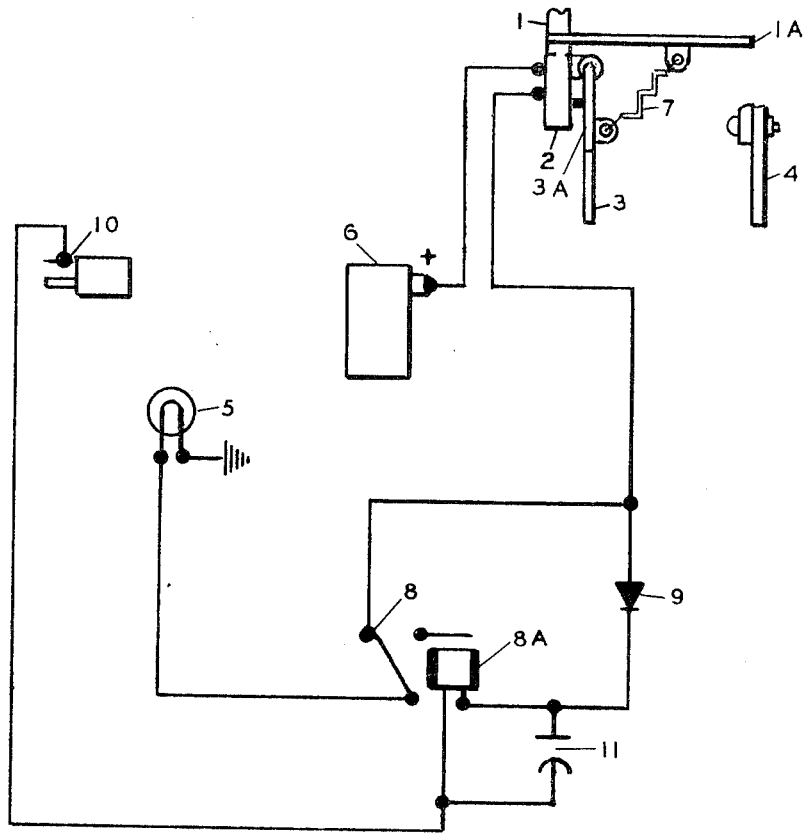
FIG. 1
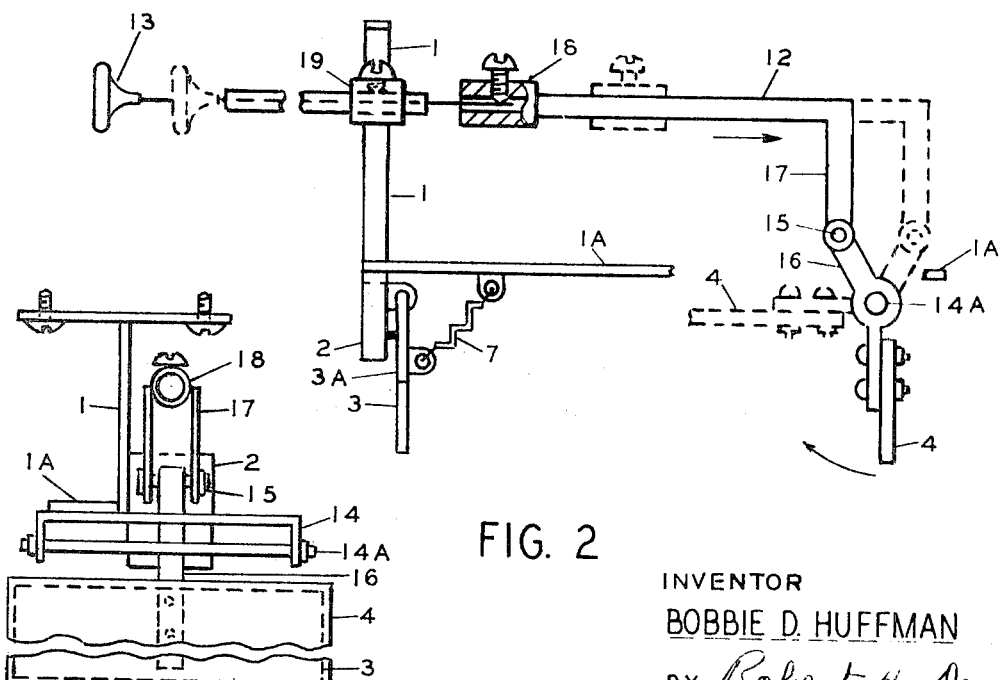
FIG. 2
FIG. 3
INVENTOR
BOBBIE D. HUFFMAN
BY Robert H. Dewey
AGENT

WARNING DEVICE FOR MOVING VEHICLE

BACKGROUND OF THE INVENTION

This invention relates generally to a warning device for a moving vehicle. In a particular aspect, this invention relates to a deceleration-detecting device suitable for activating a warning system at a predetermined but variable rate of speed of the vehicle.

It is a well known fact that one of the major problems in transportation, both on high-speed express highways as well as in congested slow-moving traffic areas, is the so-called "rear-end" collision. Accidents of this nature are occurring at an ever increasing rate and are responsible for a large part of the increase in automobile accidents and personal injuries. A major cause of the "rear-end" collision, which occurs when a decelerating lead vehicle is struck in the rear by a following vehicle, is the failure of the operator of the lead vehicle to properly signal that deceleration is intended or underway, or is due to the failure of the operator of the following vehicle to comprehend the signal, if given. Accordingly a need exists for a means of automatically warning the operator of a following vehicle, or other, of a deceleration in the rate of speed of the lead vehicle.

SUMMARY OF THE INVENTION

It is an object of this invention to provide an automatic warning device for a moving vehicle.

It is another object of this invention to provide a deceleration-detecting device suitable for activating a warning system at a predetermined but variable rate of speed of the vehicle during deceleration.

Another object of this invention is to provide a means for manually varying the predetermined rate of motion at which the speed detecting device becomes operable.

Other objects of this invention will be obvious to those skilled in the art from the disclosure herein.

Still another object of this invention is to provide a warning device which operates while the vehicle is in reverse motion.

This invention comprises an automatic warning device operating one or more warning signal means, e.g. warning lamps, on a self-propelled vehicle. The warning signal means is activated by a pressure-sensitive means which is responsive to a deceleration in the rate of speed of the vehicle at a predetermined but variable rate, and an adjustable masking means is provided for adjusting the device manually by the operator of the vehicle to respond at the predetermined rate of speed.

FIG. 1 is a schematic diagram showing the electrical circuit and the relationship with the mechanical parts.

FIG. 2 is a side view showing details of the adjustable mask.

FIG. 3 is a front view showing the adjustable mask in front of the vaned microswitch.

The device of this invention can be employed to activate the turn signal lamps of the vehicle, if any, or signal lamps can be otherwise provided.

DETAILED DISCUSSION

In the simplest embodiment of the present invention, and with reference to FIG. 1, the warning device comprises a frame 1 having a vertical arm generally T-shaped, and a forward-projecting horizontal arm 1A; the crossbar of the vertical arm is adapted to attachment to the front of the vehicle, preferably between the radiator and the grille; a microswitch 2, is mounted on the vertical arm, and a pivotably mounted vane is advantageously, but not necessarily, mounted on the microswitch, or is suspended from horizontal arm 1A. One terminal of the microswitch is conveniently connected at the electrical panelboard 6 and the other terminal is connected to a warning means, e.g. a horn, siren, or a single or multiple incandescent lamp 5, preferably, but not necessarily, connected with a flasher.

Vaned microswitches are known in the art and are commercially available. The vane is conveniently, but not necessarily, connected to the microswitch by means of an arm, 3A, and preferably is urged outwardly from the microswitch by a pull spring 7 attached to the horizontal arm 1A of the frame, e.g. a helical pull spring, to provide a minor degree of resistance. The vane is urged toward the microswitch by increasing air pressure provided by forward movement of the vehicle and when the resistance of the pull spring is overcome, the vane contacts the plunger of the microswitch and opens the circuit. Any suitable microswitch can be employed. Switch 8, relay 8A, and mask 4 shown on FIG. 1 are omitted in the simplest embodiment as set forth below.

In a preferred embodiment, an adjustable masking means is provided to adjustably shield vane 3 from air pressure. A suitable mask 4 is shown in detail in profile, FIG. 2, and front view FIG. 3. It is pivotably attached to the forward end of horizontal arm 1A by a supporting means 14 for pivot 14A and an arm 16 immovably attached to the mask is pivotably attached at 15 to a second arm 17 which is in fact a vertical extension of horizontal arm 12 which is attached to a retracting means, e.g. a coil-wrapped wire, at 18. The coil is immovably attached to frame 1 at 19 (FIG. 2), e.g. by means of a set screw in a metal tube secured to frame 1, so that the wire is free to move within the coil. The other terminal of the coil is attached to a mounting at the dashboard of the vehicle and the wire is attached to handle 13. As can be seen from FIG. 2, when the handle is pushed in, arm 12 is moved forward causing the mask to move upwardly, as shown by the dotted lines in FIG. 2, exposing the vane to air pressure. When the handle is pulled out to its furthest position, the mask is in front of the vane, totally masking it from line of sight. The mask can also be adjusted to any intermediate position.

Another embodiment of the adjustable masking means is provided by a stationary mask having an aperture of variable diameter and means for varying same. A suitable example is a stationary-mounted metal plate having a generally annular aperture, the diameter of which can be varied by an adjustable leaf structure of the type customarily used on cameras to control the aperture of the lens.

The mask can be constructed of any material relatively resistant to distortion by air current, such as metal, wood or plastic. Metal generally is preferred. In the drawings, the mask is shown retractably upward, but it is understood that it can be retracted to the either side or withdrawn to a generally lowered position without departing from the concepts of this invention.

During operation of the vehicle at low speed, in reverse, or parked with ignition on, the microswitch is normally in circuit-closed position and the warning signal is operating, e.g. the lamp, or lamps, is lighted. At higher speeds, the pressure of air on the vane forces it, or the arm to which it is attached if any, against the switch plunger and opens the circuit, whereby electrical current to the warning signal means, e.g. the lamp, is interrupted and the lamp is off. When the speed of the vehicle is reduced, the arm of the vane disengages contact with the switch plunger which returns to the circuit-closed position and the warning signal, e.g. the lamp, comes on again. The speed at which this occurs is controllable by the tension on the spring 7 and/or by the position of the mask which in turn is controllable by the operator of the vehicle by adjusting the handle. The warning device can therefore become operative at a variety of speeds, i.e. it can be controlled to warn at speeds of 50—60 m.p.h. or less for high-speed express highway driving, or it can be set for 15—20 m.p.h. for slow traffic.

An incandescent lamp, or multiple thereof, is the preferred warning signal means in the device of this invention and can be mounted in any desirable position on the vehicle. In its simplest embodiment, a single lamp mounted in the rear window of the vehicle will fulfill the principal object of this invention. Optionally the lamp can be a rotating lamp mounted on the top of the vehicle. Preferably a pilot lamp mounted on the dashboard is also employed to signal the operator of the vehicle as to the status of the warning lamp and particularly to assist him in adjusting the position of the mask in accordance with speed he selects for the warning to be lighted.

In a preferred embodiment, the warning device operates the turn signal lamps provided on the vehicle, of which there generally are four. Preferably, but not necessarily, the device operates all four of the turn signals. If the warning device is being installed during construction of the vehicle, switch 8 can be integrated with the turn signal switch so that when the turn signal lever is moved to "on" position the warning device is automatically switched out of the circuit. When the device is being installed on an existing vehicle, a relay 8A is placed in the circuit to operate switch 8. The microswitch is connected, as shown in FIG. 1, through a diode 9 to one terminal of the relay. The other terminal is connected to the negative terminal 10 of the flasher to which the turn signal lamps are connected, hereafter referred to as the first flasher unit, of the type described in reissue U.S. Pat. No.Re 24,023. A capacitor 11 is connected across the terminals of the relay, and serves to delay return of switch 8 to the circuit closed position of the warning system. The size of the capacitor is selected in accordance with the length of delay preferred. A suitable capacitor can be of 800 or 1,000 microfarad, for example, providing a delay of several seconds after the turn signal lever returns to "off" position. It is understood that the invention is not to be limited to such size capacitors.

By means of the above arrangement, the speed warning signal is automatically interrupted when the turn signal lever is placed in "on" position. After the turn has been completed and the turn signal lever returns to the "off" position, the warning device of this invention again becomes operable until the vehicle has gained sufficient speed for the vane to inactivate the system. When two or more lamps are employed with a second flasher unit which is installed on some vehicles as a stopped-vehicle warning, a diode is placed in the lead from the flasher to each lamp.

The relay and switch suitable for use in the present invention are known in the art and are commercially available, generally as a unit. The relay and capacitor should suitably match the electrical system of the vehicle, e.g. generally 12 volts.

Flasher units suitable for use in the present invention are known in the art and any suitable flasher can be used.

The diode and capacitor are also commercially available and commercially available units are suitable for the practice of this invention.

It is understood that the warning device of this invention can be used to operate other signal means than lamps. It can, for instance, be used with a horn, siren, etc. with appropriate accessories. Such variations are deemed to be the equivalent of the device described herein in detail.

The invention and its operation will be understood more fully by reference to the following descriptions of several of the embodiments of this invention.

The first and simplest embodiment was made as follows. A frame having a T-shaped vertical arm and a horizontal arm attached thereto about one-fourth the distance from the bottom was mounted behind the grille of an automobile by attaching the crossbar of the T-shaped arm to the automobile body so that the vertical arm was in front of the radiator. The frame was about 1 inch wide, made of heavy gauge steel to provide rigid support.

A microswitch manufactured by The Microswitch Corporation of Freeport, Illinois was mounted on the vertical arm with the switch button toward the grille. The microswitch was equipped with a free-swinging metal vane having an area of 4×2½ inches pivotably mounted from an arm at the top of the switch, and this equipment was mounted so that the vane was to the front, A helical spring was connected to the horizontal arm and to the arm of the vane to keep the arm of the vane from contact with the switch plunger in the absence of air pressure on the vane. In the drawing, only a single position on the frame is shown for connecting the spring, but multiple points can be provided, and in this embodiment, three were provided by means of an obliquely mounted, bendable finger having three mounting holes therein.

With the switch in the circuit-closed position, one terminal was connected with the positive terminal on the electrical panelboard and the other terminal was connected to a red flasher lamp mounted in the rear window and grounded to the automobile body so that when the ignition was turned to the "on" position, the lamp was lighted. The tension of the helical spring was adjusted by attaching one end to the frame in a suitable connecting position so that when the automobile was traveling at about 25 miles per hour or more, the air pressure on the vane overcame the resistance of the spring and moved the arm of the vane into contact with the microswitch plunger, thereby opening the circuit and the warning lamp was no longer operative. When the speed dropped below about 25 m.p.h., the vane disengaged the microswitch plunger, the circuit was closed and the warning lamp was lighted. The warning lamp also was lighted when the automobile was in parked position with ignition on, and when it was moving in reverse.

The first embodiment was repeated in all essential details except that a retractable aluminum mask was installed in front of the vane, pivotably supported by the vertical arm of the frame, thus providing the second embodiment. The mask was relatively rigid having dimensions of 4×2½ inches. It was mounted so that it could be retracted upwardly or downwardly by pushing or pulling a handle mounted under the dashboard and attached to a retracting means, which was a conventional coil-enclosed wire of the type used for opening or closing below-dashboard air vents, or the type used for operating the throttle of a gasoline-motor powered lawn mower from a standing position. The coil was connected to the dashboard and the frame, and the wire was connected with the handle and arm 12 of the masking means. The operator could adjust the mask to a preferred speed when the automobile was in motion by positioning the handle so that the warning light would operate when the speedometer indicated the preferred speed.

The first embodiment was repeated in all essential details except that the four flasher lamp turn signals provided on the vehicle were used for the warning lights and the lamp previously mounted in the rear window was instead attached to the dashboard to serve as a pilot lamp for the operator of the vehicle, thereby providing the third embodiment. The following modification was made in the electrical circuitry, thus providing a third embodiment:

A 12-volt relay single pole, two-position switch was installed between the microswitch and the flasher lamps and between the flasher lamps and the turn signal switch. A 1,000 microfarad capacitor was placed across the relay terminal of the flasher and a diode was placed between the microswitch and the relay terminal.

In this manner, the driver of the automobile was able to adjust the mask so that the lamps began flashing whenever the rate of speed dropped below a predetermined rate. Furthermore, when a turn was contemplated and the turn signal switch was turned on, the warning signaling device was automatically cut out of the circuit to the flasher lamps by means of the relay switch. Shortly after the turn was completed and the turn signal lever had returned to the "off" position, the warning signaling device was automatically returned to the circuit.

The second embodiment was repeated in all essential details except that the automobile was equipped with a flasher unit which operates all four turn signal lights to warn of a stopped vehicle. In this embodiment the warning signal device was connected to the positive terminal of the flasher and a diode was installed in the lead to each lamp.

Since many embodiments of this invention can be made and since many changes can be made in the embodiments described, the foregoing is to be interpreted as illustrative only and the invention is defined by the claims appended hereto.

I claim:

1. An automatic warning device for a self-propelled vehicle having a front and a rear comprising a pressure sensitive means responsive to a deceleration in the rate of speed of the vehicle at a predetermined but variable rate, said device being mounted at the front of said vehicle, and a signal means capable of being activated by said pressure sensitive means whereby said signal means becomes operative when said pressure sensitive means responds to said deceleration in the rate of speed of said vehicle.

2. The warning device of claim 1 comprising (a) a substantially rigid mounting means attachable at the front of said vehicle, (b) a microswitch having a circuit-closed and a circuit-open position and normally in said circuit-closed position attached to said mounting means, (c) a pivotably mounted vane responsive to air pressure resulting from forward movement of said vehicle pivotably mounted in front of, and normally urged out of contact with, said microswitch, whereby air pressure resulting from forward movement of said vehicle causes said vane to move responsive to said air pressure thereby to engage the plunger of said switch and cause it to move to said circuit-open position, (d) an adjustable masking means supported by said mounting means in front of said vane capable of shielding it in part or in whole from said air pressure, and connected to an adjusting means for said masking means operable by the operator of said vehicle, (e) a single or multiple warning signal means capable of signaling an observer of said vehicle, said microswitch being connectable between the terminal on the electrical panelboard of said vehicle and said signal means.

3. The warning device of claim 2 wherein said warning signal means is one or a multiple of incandescent lamps.

4. The warning device of claim 3 wherein said signal lamps are the turn signal lamps normally installed on said vehicle and operated by a flasher unit responsive to a turn signal switch operated by a turn signal lever having an "off" and "on" position so that when said turn signal lever is moved to said "on" position, the said turn signal switch opens the circuit between the lamps and the said microswitch, and closes the circuit between the lamps and the turn signal switch.

5. The warning device of claim 3 wherein said signal lamps are the turn signal lamps normally installed on said vehicle and operated by a flasher unit responsive to a turn signal switch operated by a turn signal lever having an "off" and "on" position, and said microswitch is connected through a diode to one terminal of a relay which operates a third switch and the other terminal of said relay is connected to the negative terminal of said flasher unit, said relay having a capacitor connected across said terminals, whereby said relay opens said third switch thereby opening the circuit between said microswitch and said turn signal lamps when said turn signal lever is moved to "on" position.

6. The warning device of claim 2 wherein the adjustable masking means is a retractable mask and the adjusting means for same is a retracting means.

7. The warning device of claim 2 wherein the adjustable masking means comprises a mask having an aperture of variable diameter and means for varying same.